US006596394B2

United States Patent
Toler et al.

(10) Patent No.: US 6,596,394 B2
(45) Date of Patent: Jul. 22, 2003

(54) COATED OPTICAL FIBER

(75) Inventors: James R Toler, Denver, NC (US); Edward J Fewkes, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/056,565

(22) Filed: Jan. 25, 2002

(65) Prior Publication Data

US 2002/0168520 A1 Nov. 14, 2002

Related U.S. Application Data

(60) Provisional application No. 60/275,769, filed on Mar. 14, 2001.

(51) Int. Cl.[7] .............................. D02G 3/00; G02B 6/00
(52) U.S. Cl. ........................ 428/392; 428/375; 385/122; 522/90; 522/96; 522/97
(58) Field of Search ................................. 428/375, 392; 522/90, 96, 97; 385/122

(56) References Cited

U.S. PATENT DOCUMENTS

| 4,404,010 A | 9/1983 | Bricheno et al. | |
|---|---|---|---|
| 2002/0146225 A1 * | 10/2002 | Bulters et al. | 385/125 |
| 2002/0168520 A1 * | 11/2002 | Toler et al. | 428/375 |

FOREIGN PATENT DOCUMENTS

| EP | 1070682 A1 | 7/1999 | |
|---|---|---|---|
| EP | 0 978 739 A2 | 9/2000 | .......... G02B/6/255 |
| EP | 1070682 A1 * | 2/2001 | |
| JP | 04275507 | 1/1992 | |
| JP | 04276706 | 1/1992 | |
| WO | WO 02/075412 A1 * | 9/2002 | |

* cited by examiner

Primary Examiner—Cynthia H. Kelly
Assistant Examiner—J. M. Gray
(74) Attorney, Agent, or Firm—Timothy R. Krogh

(57) ABSTRACT

The disclosed coated optical fiber includes a core surrounded by a cladding. At least a segment of the fiber is coated with a photopolymerizable coating composition. The photopolymerizable coating composition is a mixture of at least about 60% of a first polyurethane acrylate coating having a Young's modulus of at least about 400 MPa and about 5–40% of a second polyurethane coating having a Young's modulus of no more than about 50 MPa. The invention further includes a method of making the coated optical fiber. The method includes the steps of blending the photopolymerizable coating composition as recited above and splicing an end section of a first optical fiber having a core and a cladding to an end section of a second optical fiber having a core and a cladding, thereby forming a resultant optical fiber. The aforementioned photopolymerizable composition is applied to the end section of the first optical fiber and the end section of the second optical fiber after the resultant fiber is formed and the composition is cured.

16 Claims, 2 Drawing Sheets

COATED OPTICAL FIBER

CROSS-REFERENCE TO RELATED APPLICATIONS

This application claims the benefit of U.S. Provisional Application, Serial No. 60/275,769, filed Mar. 14, 2001 entitled COATED OPTICAL FIBER, by J. Richard Toler and Edward J. Fewkes.

BACKGROUND OF THE INVENTION

1. Field of the Invention

The present invention relates generally to the field of manufacturing of optical fibers and particularly to the field coatings for optical fiber and the application of those coatings to the optical fiber.

2. Technical Background

Optical fiber (hereinafter "fiber") has acquired an increasingly important role in the field of communications, frequently replacing existing copper wires. This trend has had a significant impact in the local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business environments for internal data, voice, and video communications has begun and is expected to increase.

Fibers typically contain a glass core, a glass cladding, and at least two coatings, e.g., a primary (or inner) coating and a secondary (or outer) coating. The primary coating is applied directly to the glass fiber and, when cured, forms a soft, elastic, and compliant material which encapsulates the glass fiber. The primary coating serves as a buffer to cushion and protect the glass fiber core when the fiber is bent, cabled, or spooled. The secondary coating is applied over the primary coating and functions as a tough, protective outer layer that prevents damage to the glass fiber during processing and use.

In the process of manufacturing fiber, the length of fiber drawn from a preform is not the same as the length of fiber that is desired by an end users. In the case that the length of fiber is to short, the fiber may be spliced together to increase the length of the fiber. In splicing two lengths of fiber together, the coating is removed from one end section of two pieces of fiber. Each uncoated end of fiber is inserted into a splicing machine and the two end sections are fused together. Splicing apparatuses are commercial available to from such suppliers as Ericsson and Fujikura.

Problems associated with splicing together two fibers include how to protect the area where the protective coatings were removed from to perform the splice. These problems include what type of coating to use and how should the coating be applied and cured. The present invention addresses these deficiencies in the art.

SUMMARY OF THE INVENTION

One aspect of the invention relates to a coated optical fiber. The coated optical fiber includes a core surrounded by a cladding and a photopolymerizable coating applied to at least a segment of the cladding of the fiber, wherein the coating comprises at least about 60% of a first polyurethane acrylate coating composition having a Young's modulus of at least about 400 MPa and about 5–40% of a second polyurethane acrylate coating composition having a Young's modulus of no more than about 50 MPa.

Another aspect of the invention relates to a method of making a coated optical fiber. The method includes blending a coating composition mixture. The mixture comprises at least about 60% of a first polyurethane acrylate coating composition having a Young's modulus of at least about 400 MPa and about 5–40% of a second polyurethane acrylate coating composition having a Young's modulus of no more than about 50 MPa. The method further includes splicing an end section of a first optical fiber having a core and a cladding to an end section of a second optical fiber having a core and a cladding. The aforementioned mixture is applied to the end section of the first optical fiber and the end section of the second optical fiber and the coating mixture is cured.

The inventive composition has exhibited the advantage of having good adhesion to glass surfaces and also good adhesion to adjacent cured photopolymerizable coating material. Another advantage of the inventive coating is that the first polyurethane coating is infinitely soluble in the second polyurethane coating and vice versa.

A further advantage of the inventive coating is that the butt splice adhesion strength of the coating is substantially stable with respect to temperature. For example for splices formed at a temperature ranging from more than about 20° C. to less than about 65° C. the butt splice adhesion strength varied less than about 10%, more preferably less than about 5%, and most preferably less than about 3%, over the afore mentioned temperature range.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
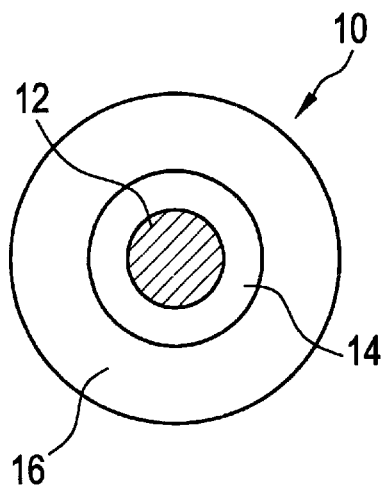
FIG. 1 is cross sectional view of a coated optical fiber.

Reference will now be made in detail to the present preferred embodiments of the invention, an example of which is illustrated in the accompanying drawings. Wherever possible, the same reference numbers will be used throughout the drawings to refer to the same or like parts. An exemplary embodiment of the optical coating of the present invention is shown in FIG. 1, and is designated generally throughout by reference numeral 10.

Now referring to the drawings, shown in FIG. 1 is a cross sectional view of a coated optical fiber 10. Referring to FIG. 1, the optical fiber 10 includes a glass core 12, a cladding layer 14 surrounding and adjacent to glass core 12, a coating material 16 which adheres to cladding layer 14. The components of the optical fiber of the present invention can optionally include a coloring material, such as a pigment or dye, or an additional colored ink coating may surround coating 16.

Preferably coating 16 comprises a photopolymerizable coating composition. The composition comprises at least about 60% of a first polyurethane acrylate coating composition having a Young's modulus of at least about 400 MPa and about 5–40% of a second polyurethane acrylate coating composition having a Young's modulus of no more than about 50 MPa. Preferably the composition comprises at least about 70% of the first polyurethane coating composition having a Young's modulus of about 400 MPa, more preferably at least about 80% of the first coating composition, and most preferably about 80% to about 90% of the first coating composition. Preferably the thickness of coating 16 comprises at least about 40 microns to no more than about 125 microns.

Preferably, coating 16 has a Young's modulus of less than about 850 MPa and optionally, more than about 100 MPa. More preferably, the Young's modulus of the composition is less than about 800 MPa. The preferred elongation at break of the coating 16 is less than about 55% and optionally more than about 10%, more preferably less than about 30%, and most preferably less than about 20%. The preferred tensile strength of coating 16 comprises less than about 33 MPa and optionally more than about 9 MPa, more preferably less than about 25 MPa and optionally more than about 15 MPa.

It is further preferred that the maximum Tan Delta occurs at a temperature of less than about 75° C. and, optionally more than about 40° C. More preferably, the maximum temperature is less than about 60° C. Dynamic Mechanical Analysis is a suitable test to measure Tan Delta and a suitable frequency is about one (1) hertz.

The first polyurethane acrylate coating composition when cured has a Young's modulus of at least about 400 MPa, preferably at least about 800 MPa, and most preferably at least about 850 MPa. Preferably, the tensile strength of the first coating composition comprises about 25 to about 40 MPa, more preferably from about 30 to about 35 MPa. Further preferably, the first coating composition has a percent elongation at break of no more than about 15%, more preferably no more than about 10%. The maximum Tan Delta of the first coating comprises a temperature of at least about 77° C. Additionally, it is preferred that the refractive index of the first coating when cured is about 1.545 at 589 nm. Example of the above coatings are commercially available from DSM-Desotech of Elgin, Ill. or from Borden Chemical of Columbus, Ohio.

The first coating composition is typically the polymerization (i.e., cured) product of a coating composition that contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433 to Chapin, the specifications of which are hereby incorporated by reference. Various additives that enhance one or more properties of the coating can also be present, including the above-mentioned additives incorporated in the compositions of the present invention.

Typical the first coating composition will include at least one UV curable monomer and at least one photoinitiator. The first coating composition may also include about 0–90 weight percent of at least one UV curable oligomer. It is preferred that the first coating composition is not a thermoplastic resin. Preferably, both the monomer and the oligomer are compounds capable of participating in addition polymerization. The monomer or the oligomer may be the major component of the first coating composition. An example of a suitable monomer is an ethylenically unsaturated monomer. Ethylenically unsaturated monomers may contain various functional groups, which enable their cross-linking. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Cognis Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Cognis Corp., and SR499, Sartomer Company, Inc.), propoxylated trimethylolpropane triacrylate with propoxylation being 3 or greater, preferably ranging from 3 to 30 (e.g., Photomer 4072, Cognis Corp. and SR492, Sartomer), and ditrimethylolpropane tetraacrylate (e.g., Photomer 4355, Cognis Corp.); alkoxylated glyceryl triacrylates such as propoxylated glyceryl triacrylate with propoxylation being 3 or greater (e.g., Photomer 4096, Cognis Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Cognis Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2- hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether (4 up) and the like (e.g., Photomer 3016, Cognis Corp.); and single and multi-ring cyclic aromatic or non-aromatic polyacrylates such as dicyclopentadiene diacrylate and dicyclopentane diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid ester and fumaric acid ester.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

As indicated above, an optional constituent of the secondary coating composition is the oligomeric component. The oligomeric component can include a single type of oligomer or it can be a combination of two or more oligomers. When employed, if at all, the oligomeric component introduced into the compositions of the present invention preferably comprises ethylenically unsaturated oligomers When employed, suitable oligomers can be either monofunctional oligomers or polyfunctional oligomers, although polyfunctional oligomers are preferred. The oligomeric component can also be a combination of a monofunctional oligomer and a polyfunctional oligomer.

Di-functional oligomers preferably have a structure according to formula (I) below:

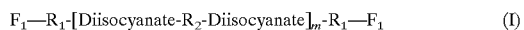

$$F_1—R_1-[\text{Diisocyanate-}R_2\text{-Diisocyanate}]_m\text{-}R_1—F_1 \qquad (I)$$

where $F_1$ is independently a reactive functional group such as acrylate, methacrylate, acrylamide, N-vinyl amide, styrene, vinyl ether, vinyl ester, or other functional group known in the art; $R_1$ includes independently —$C_{2-12}$O—, —($C_{2-4}$—O)$_n$—, —$C_{2-12}$O—($C_{2-4}$—O)$_n$—, —$C_{2-12}$O—(CO—$C_{2-5}$O)$_n$—, or —$C_{2-12}$O—(CO—$C_{2-5}$NH)$_n$— where n is a whole number from 1 to 30, preferably 1 to 10; $R_2$ is polyether, polyester, polycarbonate, polyamide, polyurethane, polyurea, or combinations thereof; and m is a whole number from 1 to 10, preferably 1 to 5. In the structure of formula I, the diisocyanate group is the reaction product formed following bonding of a diisocyanate to $R_2$ and/or $R_1$.

Other polyfunctional oligomers preferably have a structure according to formula (II) or formula (III) as set forth below:

$$\text{multiisocyanate-}(R_2—R_1—F_2)_x \qquad (II)$$

or

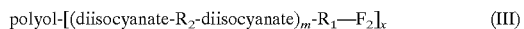

$$\text{polyol-[(diisocyanate-}R_2\text{-diisocyanate})_m\text{-}R_1—F_2]_x \qquad (III)$$

where $F_2$ independently represents from 1 to 3 functional groups such as acrylate, methacrylate, acrylamide, N-vinyl amide, styrene, vinyl ether, vinyl ester, or other functional groups known in the art; $R_1$ can include —$C_{2-12}$O—, —($C_{2-4}$—O)$_n$—, —$C_{2-12}$O—($C_{2-4}$—O)$_n$—, —$C_{2-12}$O—(CO—$C_{2-5}$O)$_n$—, or —$C_{2-12}$O—(CO—$C_{2-5}$NH)$_n$— where n is a whole number from 1 to 10, preferably 1 to 5; $R_2$ can be polyether, polyester, polycarbonate, polyamide, polyurethane, polyurea or combinations thereof; x is a whole number from 1 to 10, preferably 2 to 5; and m is a whole number from 1 to 10, preferably 1 to 5. In the structure of formula II, the multiisocyanate group is the reaction product formed following bonding of a multiisocyanate to $R_2$. Similarly, the diisocyanate group in the structure of formula III is the reaction product formed following bonding of a diisocyanate to $R_2$ and/or $R_1$.

Urethane oligomers are conventionally provided by reacting an aliphatic diisocyanate with a dihydric polyether or polyester, most typically a polyoxyalkylene glycol such as a polyethylene glycol. Such oligomers typically have between about four to about ten urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., the specifications of which are hereby incorporated by reference to describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from about 2–250 carbon atoms and, preferably, are substantially free of ether or ester groups.

Polyurea components may be incorporated in oligomers prepared by these methods, simply by substituting diamines or polyamines for diols or polyols in the course of synthesis.

The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

Suitable oligomers include BR301 is an aromatic urethane acrylate oligomer available from Bomar Specialty Co., Photomer 6010 is an aliphatic urethane acrylate oligomer available from Henkel Corp., KWS5021 is an aliphatic urethane acrylate oligomer available from Bomar Specialty Co., RCC12-892 is a multi-functional aliphatic urethane acrylate oligomer available from Henkel Corp., RCC13-572 is an aromatic urethane diacrylate oligomer available from Henkel Corp., and KWS4131 is an aliphatic urethane acrylate oligomer available from Bomar Specialty Co.

The first coating may also contain a polymerization initiator which is suitable to cause polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, must provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thicknesses of about 25–35 $\mu$m is, e.g., less than 1.0 J/cm$^2$, preferably less than 0.5 J/cm$^2$. It is preferred that the first coating composition contains at least about 5–90% of the monomer; of about 0–90% of the oligomer; and about 0.5–10% of the photoinitiator.

Suitable photoinitiators include, without limitation, 1-hydroxycyclohexylphenyl ketone (e.g., Irgacure 184 available from Ciba Specialty Chemical (Tarrytown, N.Y.)), (2,6-dimethoxybenzoyl)-2,4,4-trimethylpentyl phosphine oxide (e.g., in commercial blends Irgacure 1800, 1850, and 1700, Ciba Specialty Chemical), 2,2-dimethoxyl-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical) and combinations thereof. Other photoinitiators are continually being developed and used in coating compositions on glass fibers. Any suitable photoinitiator can be introduced into compositions of the present invention.

In addition to the above-described components, the first coating composition of the present invention can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

A preferred antioxidant is thiodiethylene bis(3,5-di-tert-butyl)-4-hydroxyhydrocinnamate (e.g., Irganox 1035, available from Ciba Specialty Chemical).

Other suitable materials for use in first coating, as well as considerations related to selection of these materials are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention.

Reference is made to U.S. Patent Application No. 60/173,874, filed Dec. 30, 1999, and Provisional U.S. Patent Application filed Jul. 26, 2000 by Botelho et al., titled Secondary Coating Compositions for Optical Fibers, the specifications of which are incorporated herein by reference as though fully set forth in its entirety, for a more detailed explanation of the first coating.

The second polyurethane acrylate coating composition has a Young's modulus of no more than about 50 MPa., preferably no more than about 40 MPa, more preferably no more than about 30 MPa, and most preferably no more than about 28 MPa. Preferably, the strength of the second coating comprises at least about 5 MPa, more preferably at least about 9 MPa. Further preferably, the second coating has a percent elongation at break of no more than about 80%, more preferably no more than about 65%, most preferably no more than about 55%. The temperature of the maximum Tan Delta of the second coating comprises a temperature of at least about 20° C., preferably at least about 30° C., more preferably at least about 34° C. Additionally, it is preferred that the refractive index of the second coating when cured is about 1.55 at 589 nm. Example of the above coatings are commercially available from DSM-Desotech of Elgin, Ill. (e.g. 950–200) or from Borden Chemical of Columbus, Ohio.

Preferably, the second coating composition will include at least one oligomer and at least one monomer. Preferably the oligomer is an ethylenically unsaturated oligomer, more preferably a (meth)acrylate oligomer. By (meth)acrylate, it is meant an acrylate or a methacrylate. The (meth)acrylate terminal groups in such oligomers may be provided by a monohydric poly(meth)acrylate capping component, or by a mono(meth)acrylate capping component such as 2-hydroxyethyl acrylate, in the known manner. It is also preferred that the oligomer is capable of participating in addition polymerization.

Urethane oligomers are conventionally provided by reacting an aliphatic or aromatic diisocyanate with a dihydric polyether or polyester, most typically a polyoxyalkylene glycol such as a polyethylene glycol. Such oligomers typically have 4–10 urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., the specifications of which are hereby incorporated by reference, describe such syntheses of the oligomers in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2–250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently nonpolar and saturated as to avoid compromising the moisture resistance of the system.

Thus, it is desirable for the second coating of the present invention to contain at least one ethylenically unsaturated oligomer, although more than one oligomer component can be introduced into the composition. Preferably, the oligomer(s) is present in an amount between about 10 to about 90 percent by weight.

Suitable ethylenically unsaturated oligomers for second coating includes polyether urethane acrylate oligomers (e.g., CN986 available from Sartomer Company, Inc., (West Chester, Pa.)) and BR3731 and STC3-149 available from Bomar Specialty Co. (Winstead, Conn.)), acrylate oligomers based on tris(hydroxyethyl)isocyanurate, (available from Sartomer Company, Inc.), (meth)acrylated acrylic oligomers, (available from Cognis (Ambler, Pa.), polyester urethane acrylate oligomers (e.g., CN966 and CN973 available from Sartomer Company, Inc. and BR7432 available from Bomar Specialty Co.), polyurea urethane acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., all of which are hereby incorporated by reference), polyether acrylate oligomers (e.g., Genomer 3456 available from Rahn AG (Zurich, Switzerland), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., the specifications of which are hereby incorporated by reference), epoxy acrylate oligomers (e.g., CN120 available from Sartomer Company, Inc., and Ebecryl 3201 and 3604 available from UCB Radcure), hydrogenated polybutadiene oligomers (e.g., Echo Resin MBNX available from Echo Resins and Laboratory (Versailles, Mo.)), and combinations thereof.

Furthermore, the second coating composition will typically include at least one monomer component. Preferably, the monomer is an ethylenically unsaturated monomer, more preferably a (meth)acrylate monomer. Generally, suitable monomers are those for which the resulting homopolymer would have a glass transition temperature ($T_g$) of at most about 20° C., preferably at most about 10° C. Generally, a lower molecular weight (i.e., about 120 to 600) liquid (meth)acrylate-functional monomer is added to the formulation to provide the liquidity needed to apply the coating composition with conventional liquid coating equipment. Typical acrylate-functional liquids in these systems include monofunctional and polyfunctional acrylates (i.e., monomers having two or more acrylate functional groups). Illustrative of these polyfunctional acrylates are the difunctional acrylates, which have two functional groups; the trifunctional acrylates, which have three functional groups; and the tetrafunctional acrylates, which have four functional groups. Monofunctional and polyfunctional methacrylates may also be employed.

When it is desirable to utilize moisture-resistant components, the monomer component will be selected on the basis of its compatibility with the selected moisture-resistant oligomer. For satisfactory coating compatibility and moisture resistance, it is desirable to use a liquid acrylate monomer component comprising a predominantly saturated aliphatic mono- or di-acrylate monomer or alkoxy acrylate monomers.

Thus, it is desirable for the second coating to contain at least one ethylenically unsaturated monomer, although more than one monomer can be introduced into the composition. Preferably, the ethylenically unsaturated monomer is present in an amount between about 10 to about 90 percent by weight.

Suitable ethylenically unsaturated monomers include lauryl acrylate (e.g., SR335 available from Sartomer Company, Inc., Ageflex FA12 available from CPS Chemical Co. (Old Bridge, N.J.), and Photomer 4812 available from Cognis f.k.a. Henkel (Ambler, Pa.)), ethoxylatednonylphenol acrylate (e.g., SR504 available from Sartomer Company, Inc. and Photomer 4003 available from Cognis), caprolactone acrylate (e.g., SR495 available from Sartomer Company, Inc., and Tone M100 available from Union Carbide Company (Danbury, Conn.)), phenoxyethyl acrylate (e.g., SR339 available from Sartomer Company, Inc., Ageflex PEA available from CPS Chemical Co., and Photomer 4035 available from Cognis), isooctyl acrylate (e.g., SR440 available from Sartomer Company, Inc. and Ageflex FA8 available from CPS Chemical Co.), tridecyl acrylate (e.g., SR489 available from Sartomer Company, Inc.), phenoxyglycidyl acrylate (e.g., CN131 available from Sartomer Company, Inc.), lauryloxyglycidyl acrylate (e.g., CN130 available from Sartomer Company, Inc.), isobornyl acrylate (e.g., SR506 available from Sartomer Company, Inc. and Ageflex IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from CPS Chemical Co.), 2-(2-ethoxyethoxy)ethyl acrylate (e.g., SR256 available from Sartomer Company, Inc.), and combinations thereof.

The second coating composition may also contain a polymerization initiator which is suitable to cause polymerization (i.e., curing) of the composition after its application to a glass fiber. Polymerization initiators suitable for use in the primary coating compositions of the present invention include thermal initiators, chemical initiators, electron beam initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, must provide reasonable cure speed without causing premature gelation of the coating composition. A desirable cure speed is any speed sufficient to cause substantial curing of the coating materials. As measured in a dose versus modulus curve, a cure speed for coating thicknesses of about 25–35 μm is, e.g., less than 1.0 J/cm$^2$, preferably less than 0.5 J/cm$^2$.

Suitable photoinitiators include 1-hydroxycyclohexylphenyl ketone (e.g., Irgacure 184 available from Ciba Specialty Chemical (Hawthorne, N.Y.), (2,6-dimethoxybenzoyl)-2,4,4-trimethylpentyl phosphine oxide (e.g., commercial blends Irgacure 1800, 1850, and 1700 available from Ciba Specialty Chemical), 2,2-dimethoxyl-2-phenyl acetophenone (e.g., Irgacure 651, available from Ciba Specialty Chemical), bis(2,4,6-trimethyl benzoyl)phenylphosphine oxide (Irgacure 819), (2,4,6-trimethylbenzoyl)diphenyl phosphine oxide (Lucerin TPO, available from BASF (Munich, Germany)), ethoxy (2,4,6-trimethylbenzoyl)phenyl phosphine oxide (Lucerin TPO-L from BASF), and combinations thereof.

As used herein, the weight percent of a particular component refers to the amount introduced into the bulk composition excluding the adhesion promoter and other additives. The amount of adhesion promoter and various other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of adhesion promoter, for example 1.0 part per hundred, is introduced in excess of the 100 weight percent of the bulk composition.

The second coating composition may also include an adhesion promoter. Suitable adhesion promoter compounds include bis(trimethoxysilylethyl)benzene and bis(triethoxysilylethyl)benzene. Bis(trimethoxysilylethyl)benzene is commercially available from Gelest (Tellytown, Pa.) and United Chemical Technologies, Inc. (Bristol, Pa.). Bis(triethoxysilylethyl)benzene can be synthesized from bis(trimethoxysilylethyl)benzene by trans-esterification with ethanol.

Preferably the adhesion promoter is present in an amount between about 0.1 to about 10 parts per hundred, more preferably between about 0.25 to about 4 parts per hundred, most preferably between about 0.5 to about 3 parts per hundred.

In addition to the above-described components, the second coating composition of the present invention can optionally include any number of additives, such as reactive diluents, antioxidants, catalysts, lubricants, co-monomers, low molecular weight non-crosslinking resins, and stabilizers. Some additives (e.g. chain transfer agents, for example) can operate to control the polymerization process, thereby affecting the physical properties (e.g., modulus, glass transition temperature) of the polymerization product formed from the second coating composition. Others can affect the integrity of the polymerization product of the second coating composition (e.g., protect against de-polymerization or oxidative degradation).

A preferred catalyst is a tin-catalyst, which is used to catalyze the formation of urethane bonds in some oligomer components. Whether the catalyst remains as an additive of the oligomer component or additional quantities of the catalyst are introduced into the composition of the present invention, the presence of the catalyst can act to stabilize the oligomer component in the composition.

A preferred antioxidant is thiodiethylene bis(3,5-di-tert-butyl)-4-hydroxyhydrocinnamate (e.g., Irganox 1035, available from Ciba Specialty Chemical).

A preferred co-monomer is the polar monomer N-vinyl-pyrrolidone available from International Specialty Products (Wayne, N.J.).

The properties of a particular embodiment of the photopolymerization coating are given below in table A.

TABLE A

| Property | First Composition | Second Composition | Photopolymerizable composition | Testing Procedure |
| --- | --- | --- | --- | --- |
| Mechanical Properties | | | | Astm 882-00 |
| Tensile Strength (MPa) | 33 | 9 | 21.42 | |
| Elongation at Break (%) | 10 | 55 | 15.3 | |
| Tensile Modulus (MPa) | 850 | 28 | 793 | |
| Coefficient of Thermal Expansion | | | | |
| Glassy Region (ppm/° C.) | | 90 | 130 | Astm E831-00 |
| Rubbery Region (ppm/° C.) | | 250 | 220 | Astm E831-00 |
| Cured Refractive Index (@589 nm) | 1.545 | 1.55 | | |
| Dynamic Mechanical Analysis | | | | |
| Max Tan Delta | 77.82 | 34 | 56.7 | Astm D4065-95 |
| Equilibrium Modulus (MPa) | 39.0 | 12 | 33.2 | Astm D4065-95 |

The Photopolymerizabe composition is 80/20 by weight of first composition and second composition The invention also includes a method of making a coated optical fiber. The method includes blending a coating composition mixture comprises at least about 70% of the first polyurethane acrylate coating composition and about 5–30% of the second polyurethane acrylate coating composition. The method further includes splicing an end section of a first optical fiber having a core and a cladding to an end section of a second optical fiber having a core and a cladding, thereby forming a resultant optical fiber. The inventive coating composition is applied to the end section of the first optical fiber and the end section of the second optical fiber and the coating is cured. Optionally the invention may include prior to the splicing step removing a dual coating system from the end section of the first optical fiber and from the end section of the second optical fiber. The method may further optionally includes applying a colorant to a section of the resultant optical fiber coated with the cured inventive coating composition. The colorant may include an ink, a dye, or any other known compound to add to color to an object or to change the color exhibited by an object.

Figure 2:
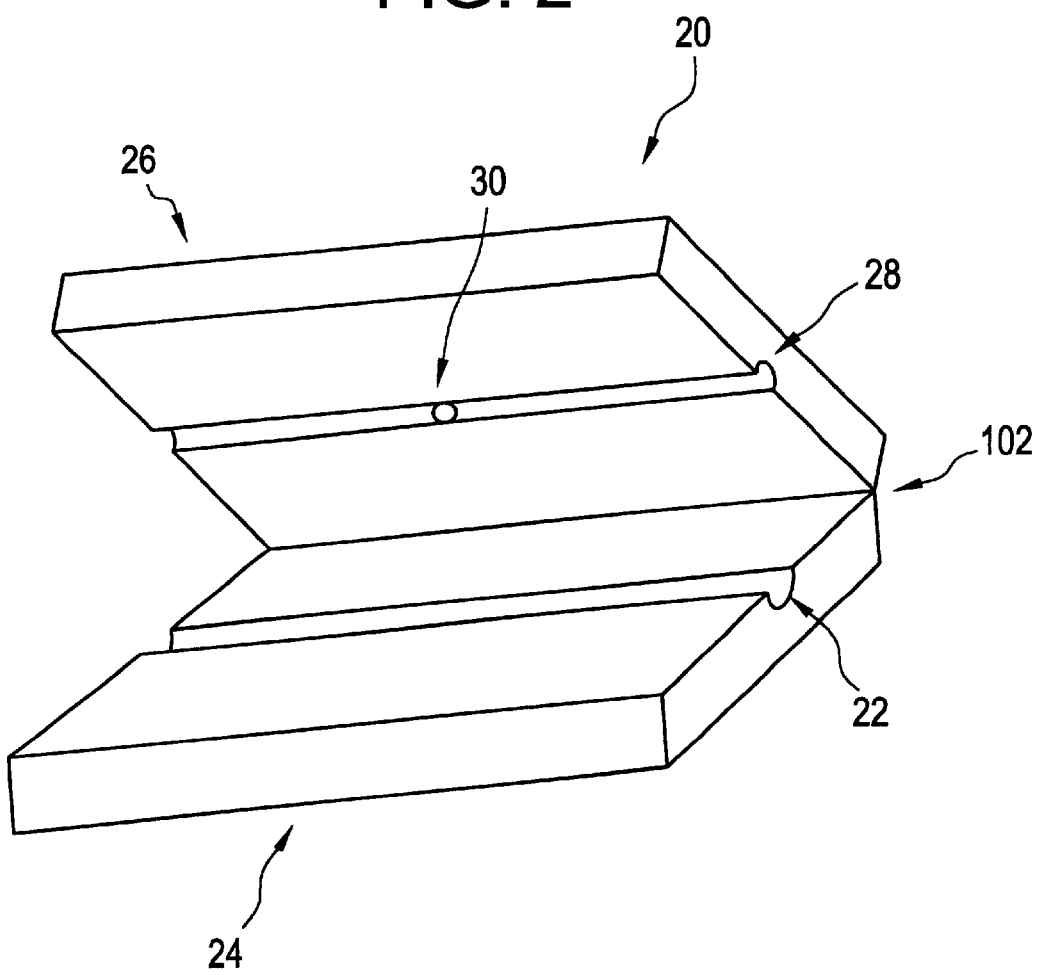
FIG. 2 is a schematic perspective view of a die for applying the inventive coating composition to an optical fiber.

Once the fibers are fusion spliced together, the inventive coating composition is applied to the spliced area such that the bare section of fiber is coated with the inventive coating composition. The inventive coating 16 can be applied to the uncoated segment of the fiber with an apparatus 20 as shown FIG. 2. Such apparatuses are supplied by, for example, Vytran, 1400 Campus Drive West, Morganville, N.J. 07751 (either their Model PTR-200 Series unit or their FFS-2000 Splice Recoater unit). The uncoated segment of the fiber (not shown) is placed in a lower fiber groove 22 of a lower die 24. An upper die 26 of apparatus 20 is closed such that upper die 26 comes down around the fiber (not shown) and lower fiber groove 22 and upper fiber groove 28 form a tubular opening containing the uncoated segment of fiber. Preferably, upper die 26 is made from a material that will transmit UV light. The inventive coating 16 is then injected into this tubular opening (22, 28) through an opening 30 in the center of upper die 26 such that the liquid coating surrounds the bare glass and coats the entire bare glass portion of the fiber, filling the tubular opening. Upper die 26 is made such that UV light can be admitted into the tubular opening (22, 28). UV light is then applied through upper die 26 to photopolymerize the injected coating. Suitable exposure periods of UV light to cure the inventive coating can be about 2 minutes or less. Suitable exposure periods can range from about 60 seconds to no more than about 9 seconds. Once the polymerization is complete, upper die 26 is opened and the coated fiber is removed. Optionally, apparatus 20 includes a hinge 32.

Known splicing equipment may be used to accomplish the splicing step e.g. Ericsson 995 splicer (available from Ericsson of Richardson, Tex.), a Fujikura 30s, Fujikura Arc Fusion Splicer FSM-40s (available from Fujikura of Reno, Nev.). U.S. Pat. Nos. 4,878,933, 4,948,412, 5,122,638, and 5,228,102 further explain the aforementioned splicing equipment. The specifications of each of the aforementioned U.S. patents is hereby incorporated by reference. The invention is not limited to any one type of splicer or any one type of splicing technique such as cladding alignment or core alignment. Also, the dual coating system on the fiber may be removed by a known fiber stripping equipment. The coating may be removed with a fiber coating stripper tool such as Model OF 103-S from Ripley Company, Miller Tool Division, 46 Nooks Hill Road, Cromwell, Conn. 06415, or Model MS-1-FS from Micro-Electronics, 70 Case Street, Seekonk, Mass. 02771, or Model No-Nik, from Clauss Company, Fremont, Ohio. U.S. Pat. Nos. 3,827,317, 4,217,729, and 4,315,444 further describe the fiber stripper tool, the specifications of each patent is hereby incorporated herein by reference.

Figure 3:
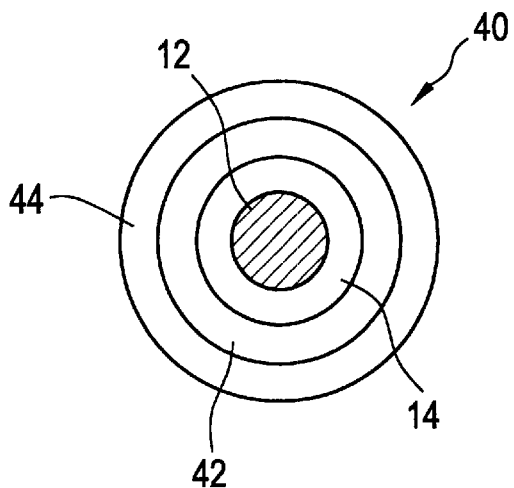
FIG. 3 is cross sectional view of an optical fiber coated with a dual coating system.

In a preferred embodiment of the invention, coated fiber includes at least one segment coated as illustrated in FIG. 1 and an adjacent segment of fiber that is coated as illustrated in FIG. 3. As depicted in FIG. 3 and generally designated 40, the fiber has a core 12 and a cladding 14. The fiber is coated with a dual coating system 42, 44. Preferably coating 42 is adjacent cladding 14. Preferably coating 42 is a soft pliable coating having a Young's modulus of less than about 10 MPa, more preferably less than about 2, MPa, most preferably less than about 1.5 MPa. Coating 44 is a stiff coating having a Young's modulus of at least about 400 MPa, preferably at least about 800 MPa, more preferably at least about 1000 MPa, and most preferably at least about 1100 MPa. The dual coating system depicted in FIG. 4 may be referred to as a shell like coating system. Preferably coating 16 bonds to coating 44. More preferably, coating 16 is soluble in coating 44, and most preferably, coating 16 is infinitely soluble in coating 44.

EXAMPLES

The invention will be further clarified by the following examples which are intended to be exemplary of the invention.

Example 1

Proof Testing

In this example, various coated fibers were proof tested on two different splicers (Ericsson 995 splicer) how the inventive coating compared to a known control recoat coating such as 950-200 available from DSM Desotech of Elgin, Ill. The coated fiber was SMF-28 and each fiber was coated with a dual coating system available from DSM Desotech. Each fiber contained ten (10) segments of the control recoat coating or an 80/20 mixture of the inventive coating composition. Each control or test segment was adjacent two segments of the dual coating system. Each fiber was proof tested three (3) times at a force of 150 kpsi. The number of gaps, formed at the junction of the dual coating system and the coated segment, visible to the naked eye were recorded. The potential number of gaps for each segment is 0, 1, or 2. This is for the reason that each segment tested has two junctions. The results are indicate below in tables 1-1 to 1-4.

TABLE 1-1

Splicer A, Control

| Splice # | Gaps after screen 1 | Gaps after screen 2 | Gaps after screen 3 |
|---|---|---|---|
| 1 | 0 | 0 | 0 |
| 2 | 0 | 1 | 1 |
| 3 | 0 | 0 | 0 |
| 4 | 0 | 0 | 0 |
| 5 | 0 | 1 | 1 |
| 6 | 0 | 1 | 1 |
| 7 | 0 | 0 | 2 |
| 8 | 0 | 0 | 2 |
| 9 | 0 | 0 | 1 |
| 10 | 0 | 1 | 1 |

TABLE 1-2

Splicer A, Test Coating Composition

| Splice # | Gaps after screen 1 | Gaps after screen 2 | Gaps after screen 3 |
|---|---|---|---|
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |

TABLE 1-3

Splicer B, Control

| Splice # | Gaps after screen 1 | Gaps after screen 2 | Gaps after screen 3 |
|---|---|---|---|
| 1 | 2 | 2 | 2 |
| 2 | 1 | 2 | 2 |
| 3 | 1 | 1 | 1 |
| 4 | 2 | 2 | 2 |
| 5 | 1 | 2 | 2 |
| 6 | 2 | 2 | 2 |
| 7 | 2 | 2 | 2 |
| 8 | 2 | 2 | 2 |
| 9 | 2 | 2 | 2 |
| 10 | 2 | 2 | 2 |

TABLE 1-4

Splicer B, Test Coating Composition

| Splice # | Gaps after screen 1 | Gaps after screen 2 | Gaps after screen 3 |
|---|---|---|---|
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |

The test coating consistently did not separate from the dual coating. This was not true for the control coating. The gap generation for the control ranged from about 50% to about 100%. Thus the inventive coating demonstrated more adhesion to the dual coating system than did the control coating.

Example 2

Adhesion Strength

The adhesion strength of, various embodiments of, the inventive coating to a secondary coating available from DSM-Desotech was evaluated. Adjacent sections of fiber were coated with the known secondary coating and various compositions of the inventive coating and each section was cured. A UV conveyor belt system was used to cure the coatings. An example of a suitable system is available from Fusion UV Systems of Gaithersburg, Md., such as model DRS 120 NQ/B.

The composition of the inventive coating ranged from about 100% of the first coating composition to about 100% of the second coating composition. The fiber coated was SMF-28. An tensile testing machine was used to pull apart the pull apart the secondary coating from the inventive coating and to record how much force was required to pull part the coating the test samples. The particular tensile testing machine was a MTS Sintech 2/G tensile testing machine commercially available from MTS Systems of Eden Prairie, Minn.

Figure 4:
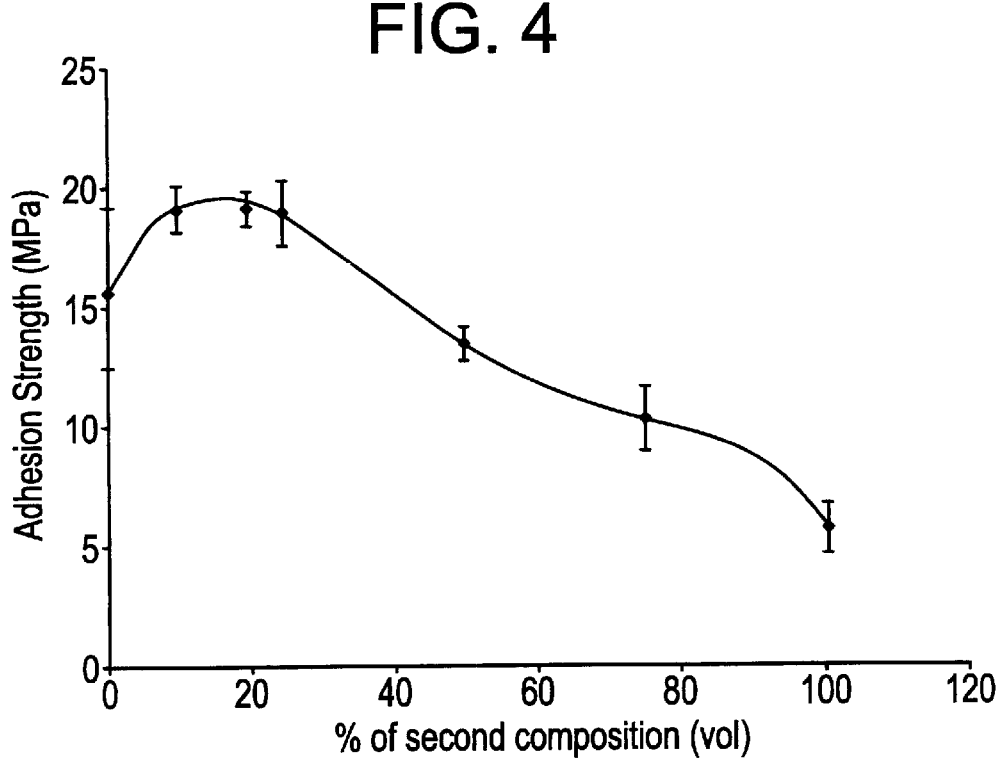
FIG. 4 is a graph of the adhesion strength of the inventive coating as a function of the concentration of the second coating composition in the inventive coating.

A preferred adhesion strength is at least about 15 MPa. The results of the example are illustrated in FIG. 4. As depicted in FIG. 4, as the amount of the second coating composition, in the inventive coating, increased to about more than about 40% (by volume), the adhesion to the secondary coating decreased to less than about 15 MPa. The adhesion strength of the samples continued to decrease as the concentration of the second coating composition increased up to about 100% of the testing coating.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A coated optical fiber comprising:
an optical fiber having core surrounded by a cladding; and
a photopolymerizable coating applied to at least a segment of said cladding of said fiber, wherein said coating comprises at least about 60% of a first polyurethane acrylate coating composition having a Young's modulus of at least about 400 MPa and about 5–40% of a second polyurethane acrylate coating composition having a Young's modulus of no more than about 50 MPa.

2. The fiber according to claim 1 wherein said coating comprises at least about 80% of said first polyurethane coating composition having a Young's modulus of about 400 MPa.

3. The fiber according to claim 1 wherein said coating has a thickness of at least about 40 microns to no more than about 125 microns.

4. The fiber according to claim 1 wherein said first composition has a Young's modulus of at least about 800 MPa.

5. The fiber according to claim 1 wherein said coating consists of said first coating composition and second coating composition.

6. The fiber according to claim 1 wherein a Young's modulus of said coating comprises less than about 850 MPa.

7. The fiber according to claim 1 wherein a Young's modulus of said coating comprises more than about 100 MPa.

8. The fiber according to claim 1 wherein a temperature of a maximum Tan Delta of said composition, when cured comprises less than about 75° C.

9. The fiber according to claim 8 wherein said temperature comprises more than about 40° C.

10. The fiber according to claim 1 wherein said coating has an elongation at break which comprises less than about 55%.

11. The fiber according to claim 10 wherein said elongation at break comprises more than about 10%.

12. A coated optical fiber comprising:
an optical fiber having core surrounded by a cladding; and
a polyurethane acrylate coating applied to at least a segment of said cladding of said fiber, wherein said coating has a Young's modulus of at least 50 MPa, a thickness of at least about 40 µm, a percent elongation at break of greater than about 10%, and Tan Delta at a temperature of less than about 70° C.

13. The coated fiber in accordance with claim 12 wherein said coating has a tensile strength of less than about 30 MPa.

14. The coated fiber in accordance with claim 12 wherein said Young's modulus comprises less than about 800 MPa.

15. The coated fiber in accordance with claim 12 wherein said coating has a coefficient of thermal expansion of more than about 100 ppm/° C.

16. The coated fiber in accordance with claim 12 wherein said coating has an adhesion strength of at least about 15 MPa.

* * * * *